US010214434B2

(12) United States Patent
Rissanen

(10) Patent No.: US 10,214,434 B2
(45) Date of Patent: Feb. 26, 2019

(54) METHOD FOR THE TREATMENT OF METALS

(71) Applicant: Global EcoProcess Services Oy, Tampere (FI)

(72) Inventor: Vesa Rissanen, Lempäälä (FI)

(73) Assignee: Global Ecoprocess Services Oy, Tampere (FI)

( * ) Notice: Subject to any disclaimer, the term of this patent is extended or adjusted under 35 U.S.C. 154(b) by 290 days.

(21) Appl. No.: 15/021,596

(22) PCT Filed: Sep. 12, 2014

(86) PCT No.: PCT/FI2014/050700
§ 371 (c)(1),
(2) Date: Mar. 11, 2016

(87) PCT Pub. No.: WO2015/036658
PCT Pub. Date: Mar. 19, 2015

(65) Prior Publication Data
US 2016/0229721 A1    Aug. 11, 2016

(30) Foreign Application Priority Data
Sep. 12, 2013  (FI) ...................................... 20135921

(51) Int. Cl.
| C02F 1/66 | (2006.01) |
| A62D 3/33 | (2007.01) |
| B09C 1/08 | (2006.01) |
| C04B 28/02 | (2006.01) |
| C04B 28/18 | (2006.01) |
| C02F 5/02 | (2006.01) |
| C01B 35/12 | (2006.01) |
| C02F 101/20 | (2006.01) |
| C02F 103/16 | (2006.01) |
| A62D 101/24 | (2007.01) |
| A62D 101/43 | (2007.01) |
| C04B 103/60 | (2006.01) |
| C04B 111/00 | (2006.01) |

(52) U.S. Cl.
CPC .................. *C02F 1/66* (2013.01); *A62D 3/33* (2013.01); *B09C 1/08* (2013.01); *C02F 5/02* (2013.01); *C04B 28/02* (2013.01); *C04B 28/18* (2013.01); *A62D 2101/24* (2013.01); *A62D 2101/43* (2013.01); *C01B 35/12* (2013.01); *C02F 2101/20* (2013.01); *C02F 2103/16* (2013.01); *C02F 2301/08* (2013.01); *C04B 2103/606* (2013.01); *C04B 2111/00112* (2013.01); *C04B 2111/00767* (2013.01); *Y02W 30/91* (2015.05)

(58) Field of Classification Search
CPC ....................................................... C02F 1/66
See application file for complete search history.

(56) References Cited

U.S. PATENT DOCUMENTS

| 3,126,351 A | 3/1964 | Blair et al. |
| 3,126,352 A | 3/1964 | Blair et al. |
| 3,641,972 A | 2/1972 | Hostetter |
| 4,687,373 A | 8/1987 | Falk |
| 5,037,479 A | 8/1991 | Stanforth |
| 5,130,051 A * | 7/1992 | Falk .......................... B09C 1/08 106/606 |
| 5,545,805 A | 8/1996 | Chesner |
| 5,630,785 A | 5/1997 | Pridemore et al. |
| 6,139,621 A | 10/2000 | Edlinger |
| 6,409,793 B1 | 7/2002 | Edlinger |
| 7,419,604 B1 | 9/2008 | Atwood |
| 2006/0201822 A1 | 9/2006 | Klein |
| 2008/0308423 A1 | 12/2008 | Slater |
| 2011/0162976 A1 | 7/2011 | Farooq et al. |

FOREIGN PATENT DOCUMENTS

| CL | 196600088 A | 5/1966 |
| CN | 1475325 A | 2/2004 |
| EP | 352096 A2 | 1/1990 |
| JP | S-63502570 A | 9/1988 |
| JP | H-0263591 A | 3/1990 |
| JP | H1147713 A | 2/1999 |
| JP | H1199370 A | 4/1999 |
| JP | 2005536335 A | 12/2005 |
| WO | 2014076375 A | 5/2014 |

OTHER PUBLICATIONS

European Patent Office, Search report of EP14844259.3, dated Apr. 18, 2017.
Office action issued in the corresponding Japanese application No. 2016-542344 issued by the Japanese Patent Office dated Feb. 27, 2018.
Solubilities of Inorganic and Organic Compounds, vol. 3, Part 1, No. 362 [1414].
Kirk-Othmer Encyclopedia of Chemical Technology, vol. 3 Interscience, New York (1964), pp. 617-651.
The Development of Zinc Borate Production, by H. Emre Eltepe, Izmir Institute of Technology, Nov. 2004 Turkey.
Office action of CL2016-000592 dated Nov. 21, 2017 issued by Chilean Patent Office.
Ma Experimental studies on solid-stage reduction of pickling sludge generated in the stainless steel production, Scandinavian Journal of Metallurgy, vol. 34, 2005, pp. 31-40.
Kheifets, V.I et.al; Composition of slightly soluble compounds precipitated by bases from Nickel salt solutions in the presence of boric acid, Mar. 19, 1954), 24, 1471-1474 (in Russia pp. 1486-1490).

* cited by examiner

*Primary Examiner* — Peter Keyworth
(74) *Attorney, Agent, or Firm* — Berggren LLP Law Firm

(57) ABSTRACT

A method for precipitating metal waste is characterized in that the waste which contains one or more dissolved metal salts, is mixed with a boron compound, and the pH is adjusted to a value at which precipitation takes place in the presence of precipitation nuclei necessary for the formation of metal borates.

15 Claims, No Drawings

METHOD FOR THE TREATMENT OF METALS

PRIORITY

This application is a U.S. national application of the international application number PCT/FI2014/050700 filed on Sep. 12, 2014 and claiming priority of Finnish national application FI20135921 field on Sep. 12, 2013, the contents of both of which are incorporated herein by reference.

The invention relates to a method for the treatment of metals, for example metallic precipitates. In this application, metallic precipitates refer to any precipitates and sludges which contain a metal that can dissolve therefrom and end up in the environment along with waters. This metal may be a heavy metal or another metal.

Pickling of metals refers to a method for removing rust and any indefinite oxidized layer by dissolving in acids. By pickling, a homogeneous surface is provided, particularly at welded seams, where a homogeneous oxide layer will be formed later, particularly a Cr oxide layer on stainless steels. In the pickling iron (Fe), chromium (Cr), nickle (Ni) and molybdenum (Mo) are typically dissolved. A typical pickling bath contains 2 to 4% of hydrofluoric acid (HF) and 25 to 30% of nitric acid ($HNO_3$). The pickling acid may also contain hydrochloric acid (HCl) and sulphuric acid ($H_2SO_4$). Pickling with phosphoric acid ($H_3PO_4$) is also in use, and hydrogen peroxide ($H_2O_2$) is also used as an oxidizing agent. A chromium-poor zone formed directly below the oxide layer during welding or various hot forming works, is also removed by pickling of stainless steels.

In addition to acid pickling, electrolytic pickling is known and used, in which a steel strip to be pickled is passed through a sodium sulphate solution, and fresh sulphuric acid dissolving the oxides to form sulphates is continuously formed as a result of an anode reaction. This method is suitable, among other things, for continuous pickling of a metal strip. Pickling acids are regenerated in a number of ways, such as by vacuum evaporation, by utilizing ion exchange resins, and by precipitation with lime ($Ca(OH)_2$). Electrical separation is also used in the form of so-called electrodialysis, in which separation membranes are permeable to acids but not salts. The method is expensive. Other methods include, among other things, liquid-liquid extraction with tributyl phosphate (TBP).

In pickling, precipitate is always formed, consisting of either sulphates of heavy metals and iron that dissolve in pickling, or their oxides. Typically, precipitate is formed for e.g. iron as follows:

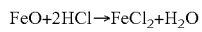

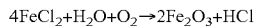

The oxygen required for the reaction comes either from the air, from nitric acid, or preferably from hydrogen peroxide. In this way, the pickling acid regenerates by itself, and the same applies to other metals if the primary pickling acid is hydrochloric acid, or hydrofluoric acid in combination with nitric acid. If the pickling acid is primarily sulphuric acid, or if it is present in a sufficient amount, $Fe_2(SO_4)_3$ and $Cr_2(SO_4)_3$, as well as $NiSO_4$ are formed. Initially, these metals were present in the form of sulphates, fluorides or nitrates, the corresponding acids being regenerated as these compounds are replaced by strong sulphuric acid. In principle, in $HF+HNO_3$ pickling, the entire acid regenerates by itself, and only nitric acid is consumed for oxidation, and in the system of $HF+HNO_3+H_2SO_4$, only sulphuric acid is consumed. The sulphates can be removed by crystallizing, and/or HF and $HNO_3$ can be removed by vacuum evaporation (Outotec method) and re-used.

In addition to pickling, metal precipitates and sludges are formed as waste in various industrial processes. In hard chrome plating, for example, metal working tools are plated with chrome in a galvanic process involving a chromic acid bath. Metals are dissolved in the chromic acid used in the same way as described in connection with pickling above. Similar processes to be mentioned also include so-called decorative plating processes, for example black chrome and bright chrome plating, as well as yellow, green, black etc. passivations. In hot zinc coating, too, metals dissolve and form precipitates and sludges in the treatment solutions. In industrial processes, the environmental problem of metallic waste is typically addressed by various neutralization processes as well, wherein the aim is to bring the harmful metals to a state that is as stable as possible by binding them to, for example, gypsum slurry or slag.

There are numerous patent documents which describe the regeneration of pickling acids, but only a few notes about how the precipitates formed from the pickling acid can be treated without transporting them to hazardous waste treatment plants or so-called specially engineered landfills.

Scandinavian Journal of Metallurgy, Vol 234, Issue 1, pp 31-40, 2005, tells how pickling precipitate is neutralized with lime ($Ca(OH)_2$), treated at the temperature of 1400° C. and reduced with coke to a metal alloy.

Chinese patent application CN01475325 A1 teaches how pickling sludge is mixed with raw materials of a cement kiln, producing a cement product which is no longer hazardous according to Chinese regulations (in Finland, $Cr^{6+}$, which is often formed in the production of cement, has to be treated with $Fe^{2+}$).

US patent application 2006/0201822 A1 presents how pickling acid is neutralized by bases, water is evaporated off, and the salts are decomposed at a temperature of ~500° C. The volatile acids are recovered, and the metals are converted into oxides.

US patent application 2008/0308423 A1 mentions that boric acid is used with chlorhexidine as a synergic agent in an electrolytic solution to inhibit the growth of bacteria.

US patent application 2011/0162976 A1 mentions that boric acid is used as a catalyst in the electrolytic recovery of a pickling solution by electrolysis and ultrasound.

Japanese patent application JP-1199370A1 teaches how lead contained in fly ash is stabilized by mixing alkali metal borate with blast furnace slag, and adding the treatment agent obtained in this way to fly ash from a waste incineration plant, and adding water to the mixture.

Kheifets, V. L.; Rotinyan, A. L.; Kozich, E. S.; Kalnina, E. N. present in Zhurnal Obshchei Khimii (1954), 24, 1486-90, how a borate complex was obtained under laboratory conditions by titrating a nickel sulphate solution with NaOH in the presence of boric acid ($H_3BO_3$).

Metal precipitates and sludges are also found in the form of hazardous waste requiring purification in the soil, often at sites where industrial activity of the above described kind has been in operation. Impregnation of wood is another common cause of metal waste in the soil, because copper, chromium and arsenic salts have been used in impregnating agents. In water bodies, metallic waste that cause contamination of the soil may have their origin in emissions from the paper industry and in barnacle-repelling paints on ships.

Solid precipitates or soil materials are characterized in that the metal contained in them tends to dissolve due to the relatively high solubility product of the precipitates. Consequently, when the precipitate comes into contact with large amounts of liquid, for example because of the weather conditions, harmful metals are released with the liquid into the environment. Certain precipitates may also be poorly separable as such because of their physical properties (for example, light weight).

It is an aim of the invention to present a method by which soluble metallic precipitates or metals already in dissolved form can be precipitated into a form that is permanently insoluble and thereby does not load the environment. The invention relates in general to a method for treating any metals, and particularly metals that are harmful for the environment, in such a way that they are brought to a form that is, in practice, permanently insoluble, from mixtures which may also contain other substances than the metals to be treated. Said metal may be present in a variety of mixtures which are characterized in that the metal, if it is not already dissolved, can dissolve in water and spread elsewhere in an uncontrolled manner.

It is also an aim of the invention to present a method by which hazardous metals (heavy metals, other metals) are brought to such an insoluble form in which they are stable and do not involve a risk of leaking into the environment, wherein they can be treated, for example, locally, and they do not need to be transported long distances to a hazardous waste treatment plant for treatment and storage. However, the invention is also applicable in hazardous waste treatment plants for the treatment of precipitates, sludges, as well as solutions that contain dissolved metals, brought to them. In addition to waste from the metal and steel industries, the invention is also suitable for the treatment of metals in waste and storage ponds for the mining industry, as well as metal waste from contaminated land areas. To attain these aims, the method according to the invention is primarily characterized in what will be presented in the characterizing part of the appended claim 1. Advantageous embodiments of the invention will be presented in the appended dependent claims.

According to the invention, the metal is formed into a solid, practically insoluble (with respect to said metal) precipitate by the combined action of a boron compound and the pH, by utilizing precipitation nuclei formed in another precipitation reaction. This "other precipitation reaction" where suitable precipitation nuclei are formed can be the hydroxide precipitation of another metal, generally iron, which takes place at a lower pH than the hydroxide precipitation of the metal in question, or, in the case of iron, a metal borate already formed. This other precipitation reaction where precipitation nuclei are formed can also take place outside the mixture in which the actual precipitation of the metal to an insoluble form takes place; in this case, the precipitation nuclei obtained, for example borates of the same metal or a different metal, are added to this mixture from the outside.

Dissolved iron and copper also act as a pair in such a way that when copper is present, with increasing pH the copper begins to precipitate as a borate by the effect of iron hydroxide that was formed already at a lower pH. Correspondingly, the precipitation of iron into borate begins by the effect of copper borate. Corresponding pairs of metals or mixtures of several metals, containing iron that forms a hydroxide at the lowest pH, can be used in a corresponding way.

The process always requires a liquid phase, normally water, in some form. The substance that contains one or more metals to be treated (precipitated) may be a solution, a sludge, or a solid mixture that contains water. If the waste that contains metals is in the form of dry solids, it can be suspended in water, or water can be admixed with it to increase the water content. For any of these mixtures which can be called a process mixture, conditions can be provided under which the precipitation nuclei are formed in the process mixture itself, or they can be introduced from the outside, as mentioned above.

In this context, the metals to be treated also refer to semi-metals, such as antimony and arsenic. Thus, the invention is suitable for the purification of, for example, waters and soil contaminated with arsenic.

DETAILED DESCRIPTION OF THE INVENTION

In principle, any dissolved metals can be largely removed from solutions by alkaline precipitation, that is, in the form of hydroxides. It is even possible to separate metals from each other by varying the pH, as exemplified below:

(the pH given is the optimum point of precipitation for the example metal ion)

| | |
|---|---|
| $Fe^{3+}$ pH 6.40 | solubility $5.8 \times 10^{-11}$ mg/liter |
| $Cr^{3+}$ pH 7.4 | 0.08 mg/l |
| $Ni^{2+}$ pH 11.0 | 0.001 mg/l |
| ($Ni^{2+}$ pH 6.4 | 500 mg/l) |

However, alkaline precipitation does not solve the problems as such, because the metals are easily re-dissolved from these precipitates.

Under acidic conditions, it is hardly possible to precipitate metals at all.

It is known that borate compounds are very poorly soluble. The solubility products for borate compounds are just not found in the literature, and borate compounds are not formed merely by mixing boric acid and a metal salt under normal conditions. In the following, examples on analogical solubility products for weak acids and metals will be given:

Cd arsenate $Cd_3(AsO_4)_2$, solubility product $K_{sp}$ at +25° C. is $2.2 \times 10^{-33}$, $Cd_3(PO_4)_2$ solubility product $2.53 \times 10^{-33}$, $CO_3(PO_4)_2$, $K_{sp}$=$2.05 \times 10^{-35}$, $Ni_3(PO_4)_2$, $K_{sp}$=$4.74 \times 10^{-32}$ The solubility product is defined as follows, for $Fe(OH)_3$ as an example: $K_{sp}$=$[Fe^{3+}] \times [OH^-]^3$=$2.9 \times 10^{-39}$ mol/liter ($5.8 \times 10^{-11}$ mg/liter), pH=6.4

In a mixture of boric acid and, for example, nickel sulphate and water, the lowest Ni sulphate content is 4.76 wt-%; the content of boric acid is then 11.19 wt-% and water 84.05 wt-%. (Source: Solubilities of Inorganic and Organic Compounds, Volume 3, Part 1, No. 362 [1414]). It is seen that poorly soluble heavy metal compounds cannot be obtained merely by mixing these compounds together at a normal temperature. However, among other things, Zn, Ni, Cr, and Co borates have been reported to exist and to be very poorly soluble. (Reference Kirk-Othmer Vol 3, page 651, 1964, tells how Mn, Fe, Co, Ni, Cr are precipitated by boric acid to poorly soluble forms.) Nevertheless, the conditions at which the precipitation takes place, are not defined.

It is very presumable that borates, too, act in a way similar to arsenates and phosphates, etc., although their solubility products do not seem to be found in the literature. Although actual borate salts of heavy metals are not formed except in molten state or at high temperatures, ligands, i.e. chained reticulated compounds, are easily formed. Borates and boric acid are trivalent, so that they form polymers like $AlCl_3$ (The Development of Zinc Borate Production, by H. Emre Eltepe, Izmir Institute of Technology, November 2004 Turkey).

Laboratory tests clearly showed that metal borates cannot be prepared by merely mixing the reagents together, but the conditions of constantly increasing pH is also needed so that the metals first precipitate into hydroxides, each in its own range for precipitation, and when an introduced boron compound is present in this process, it will adhere to the hydroxides as they are being formed, so that the metal borates are formed by the joint effect of the pH and precipitation nuclei consisting of the hydroxides or already formed borates. Thus, the formation mechanism of the metal borates is a combination of chemistry and hydrometallurgy: to start, the chemical reaction requires a precipitation nucleus known from metallurgical processes. This observation seems to have been previously unknown and to have been found out in connection with these experiments. This explains largely why the literature data on the preparation of metal borates is so deficient.

The borates are formed when the concentration increases and the pH changes, and also after suitable precipitation nuclei have been formed in the reaction or they have been added to start the reaction. Experiments have shown that for most metals, the metal's own hydroxide does not act as such a nucleus. Instead, the metal's own borate ligands act as nuclei after the reaction has first started. In most cases, it is sufficient that the process involves another metal, for which the pH value for the precipitation into a hydroxide is lower than the pH for the hydroxide precipitation of the metal intended to be borated. Thus, the hydroxide of the other metal acts as a precipitation nucleus in an excellent way. Such a metal is, for example, iron which precipitates even at a relatively low pH.

However, it is not always as simple as that. Each metal has a detectable pH value, at which the precipitation into a hydroxide starts, and a higher pH value, at which the precipitation is at its strongest. For most metals, however, the hydroxides start to re-dissolve when the pH increases further. Therefore, such a metal should be selected as the precipitation nucleus whose precipitation into a hydroxide takes place at a lower pH value, sufficiently close to this metal to be borated, so that there is no time for re-dissolving to take place, or a metal for which no re-dissolving will occur. Examples of the latter include Fe, Cu, Ni, and Cd. Iron is expressly characterized in that no re-dissolving takes place as the pH increases. Iron is also useful in the sense that it is already contained in a large number of substances to be treated. Therefore, in process mixtures whose pH is gradually increased or in which the pH increases inherently, iron that is already present can be used as an aid.

Laboratory tests also showed that when the formation of borate ligands of any metal was started in the solution, these formed precipitation nuclei for all the metals present in the concentrate. Consequently, the precipitation nuclei are essential for the process and particularly significant for starting the reaction.

If the metals to be precipitated into borates do not include any metals suitable for forming the precipitation nuclei, or if only one metal is to be precipitated, the precipitation nuclei can be introduced from the outside, particularly in the form of already formed borates.

Now, in the present invention, we have found a solution to treat hazardous metal precipitates in such a manner that they are brought in an advantageous way to a completely harmless form. According to the method, the concentration increases and the pH changes from 7 to 11.5 in a stepless manner. The operation range may start from a lower pH value and end up in a the higher pH value; in other words, it comprises said range of pH change. The increase can be stopped at a pH value lower than 11.5, depending on the metals to be precipitated present in the substance to be treated.

The method also comprises another variant, in which the pH is adjusted constant, if a given metal is to be precipitated into a borate. Thus, the pH is adjusted to a value at which the precipitation into hydroxides is at its strongest, and it is provided that suitable precipitation nuclei are involved in the reaction. If other metals are present in the solution, whose hydroxides can be considered suitable precipitation nuclei, the pH process can be arranged such that the pH is allowed to change in a stepless manner until it has reached the value at which the metal to be borated is precipitated most strongly.

When borates are precipitated from a metal or metals, re-dissolution known from hydroxide or sulphide precipitation is prevented even if the pH went on increasing. This is explained by the solubility products which are extremely low ($10^{-32}$ ... $10^{-59}$). Experiments have shown that in the overflow separated after the precipitation, the metal contents are at zero level, so the method is a very efficient way to precipitate metals, particularly for addressing environmental problems or, for example, recovering metals.

So far, metals have referred to alkaline earth metals, transition elements (so-called metals proper), and post-transition or other metals, as well as at least uranium from the actinides, the chemical behaviour of all of these corresponding to that presented above.

In addition to these, the alkali metals and semi-metals act in the same way as the above mentioned elements when precipitated. However, permanent insolubility cannot always be achieved for alkali and semi metals, but in some cases the borate precipitate will only remain stable until the conditions are changed. This precipitate can be made stable in various ways, for example by binding it to gypsum slurry or slag, or by casting it with cement in concrete, as will be explained further below.

Under laboratory conditions, with suitable nuclei, surprisingly arsenic and antimony among the semi-metals were successfully borated. One can estimate that the method has a particularly great importance in this respect, because, among other things, the As levels of tap water have been substantially decreased, e.g. in the USA and in Europe, to 10 µg/l, and are planned to be decreased further to the level of 2 µg/l. In the USA only, according to official estimates, the annual treatment costs with present techniques is projected to increase from about USD 270 million to USD 2100 million.

Precipitate or sludge that contains metal waste may normally be present in two typical phases. In the liquid phase, a ligand-type metal borate precipitate can be isolated from the rest of the phase by separating the overflow and the overflow from each other after the treatment. In the solid or solid-type phase, for example as part of soil, gypsum slurry or slag, the separation of the precipitate is possible as well, when the solid phase is first suspended into a suitable liquid phase. It is also possible to use the treated solid phase or the separated borate ligand as such, without suspending, as an ingredient in concrete, and to utilize it in this way. In any case, the borate obtained in this way is insoluble, and for example its storage does not require any particular maintenance measures, for example in view of controlling the pH, or the like.

Thus, the present invention provides a method which is inexpensive in view of the treatment costs and is very efficient, for treating metals and environmentally hazardous metals and heavy metals into a harmless form.

The boron compound to be used may be a suitable hydroxo compound of boron, or a compound that contains boron as an oxo-anion. An example of the former is acids of boron (oxoacids), particularly boric acid $H_3BO_3$. An example of the latter is borate salts, particularly alkali metal borates, such as borax. Boric acid $H_3BO_3$ is the most common acid of boron and an inexpensive precipitation chemical which is capable of forming poorly soluble precipitates with metal hydroxides. Borax (Na borate), in turn, is a commonly occurring form of boron acting in the same way. Later changes in the conditions, such as changes in the pH, cannot affect the precipitate either, because the metal hydroxides form very permanent precipitates with boron compounds, which precipitates are held together by OH groups. Certain boron compounds, in which the boron is bound to oxygen, tend to form chains or networks enabled by the hydrogen bonds formed by the hydroxy groups. The precipitate is a borate, to which the metal to be separated is bound.

Calculated as elemental boron per metal equivalent, the boron compound is preferably used in a molar ratio between 3:2 and 3:1, depending on the desired removal rate and the chemical structure of the precipitate formed. Thus, boron is preferably used in a molar ratio between 3:1 and 6:1 per bivalent metal.

Kirk-Othmer, Vol. 3, pp. 651, from 1964, tells that heavy metal borates are formed under alkaline conditions and that these are very poorly soluble. Now knowing, however, that hydroxides of these metals, which hydroxides themselves are poorly soluble, are precipitated under alkaline conditions, we have provided, in our invention, conditions with variable pH and sufficient time for completing these reactions for forming very poorly soluble borates.

The invention comprises producing a process mixture with a sufficient quantity of water, adding a boron compound to this mixture, and increasing the pH of this process mixture to a desired value or continuously to cause hydroxy precipitation of one or several metals to be treated. Finally, water is separated from the solids, and the solids comprising the metal borate in insoluble form are subjected to final disposal or further treatment.

However, it is possible to prepare a process mixture in which the pH increases by itself without adjusting the pH from the outside.

In an advantageous embodiment, this is provided by mixing the metal precipitate with cement or concrete. It is thus essential to utilize the reactions of the cement in the formation of very poorly soluble metal borates. When the cement or concrete is hardened, calcium hydroxide is released, the liquid becomes alkaline, and the metals to be treated, such as heavy metals, first turn into hydroxides and then, in time, to borates which are very poorly soluble. In the following, the reactions will be described with reference to concrete that contains cement.

When the concrete is hardened, hydration of Ca silicates takes place; in other words, water in the concrete is decreased by the hardening; at the same time, lime is dissolved from tricalcium silicate ($C_3S$), and this silicate turns into dicalcium silicate ($C_2S$)+$Ca(OH)_2$. Later on, the lime will turn into $CaCO_3$, but this will take decades. By contrast, carbonation occurs relatively quickly on the surface of the concrete by carbon dioxide contained in the atmosphere.

A typical water/cement ratio in concrete is 0.3 to 0.45; ideally it would be 0.24, because this amount of water is taken up by the hydration of cement. With the water/cement ratio of 0.24 it would hardly be possible to make concrete, except with a so-called milling hollow nucleus slab machine. In modern concrete, the cement content is typically 300 kg/m$^3$, and the water/cement ratio is 0.35. According to the standards, the concrete reaches its design strength in 28 days, at a normal temperature of +20° C. Thus, the water uptake for hydration will be about 60%=0.6×0.24=0.144× (0.35−0.11)×300=61.8 kg of water per m$^3$ of concrete. The final free water content will be 0.35−0.24=0.11×300=33 kg per m$^3$ of concrete. Theoretically, the amount of water is halved. However, there is also the water that was removed by evaporation. Thus, the concentration will increase further. For example, when the dry content of pickling precipitate is typically 11 to 12%, a quantity of 61.8 15×1.1=68 kg per m$^3$ of precipitate could be easily added per m$^3$ of concrete.

The calculation above was for normal Portland cement. However, for example pickling precipitate contains 88% of water, of which about 30% is acid ($HF+HNO_3$), and this acid has to be neutralized with lime released from the concrete or lime to be added separately. Consequently, this water has an acid content of about 18 kg=~300 mol, which has to be neutralized with lime ($Ca(OH)_2$) in an amount of 150 mol=11.1 kg. From concrete with a $C_3S$ content of 45%, lime is released in an amount of 33 kg and ~20 kg/m$^3$, in the case of 60% hydration. We see that even in this respect, it is possible to add 68 kg of oxide precipitate per m$^3$ of concrete, as planned. Furthermore, the precipitate contains heavy metal salts in about 1000 mg/l=68 g per maximum quantity of precipitate, which is not significant in this calculation.

A large variety of other cements are also known, such as pozzolan cements and super sulphate cements, as well as aluminate cements. An interesting field for the present invention is aluminate cements which are used for making fireproof structures (for example, refractory brickwork). The aluminate cements reach their final strength when they are "fired" at a sufficiently high temperature. If they are blended with heavy metals and boron compounds, genuine, completely insoluble metal borates will be obtained.

The pozzolan cements, in turn, are such that they "take in" lime instead of dissolving it in water, like the Portland cements. The pozzolan cements consume water in the same way as the Portland cements; the reaction is $CS+Ca(OH)_2 \rightarrow CS_2$ (this notation is the code system used by cement chemists to avoid writing complex chemical formulae).

As the hydration proceeds, the pH gradually turns alkaline up to the value of 11.5. At the pH value of 6.4, the dissolved iron has already been precipitated and binds more water when it is changed to the form of $Fe(OH)_2$ tai $Fe(OH)_3$. As described above, the iron will first form a precipitation nucleus for the other metals which together with the boron compound form reticulated compounds. These compounds are held together by the hydrogen bond between the —OH groups just in the same way as takes place in paper manufacture, and said reticulate ligands are formed. These ligands are thus quite insoluble after they have been dewatered to a given level.

The ligands formed are detected by the fact that the heavy metal precipitate and the boron compound together form a product that is tough compared with mere heavy metal precipitate. In the invention, we typically use the boron compound (calculated as boric acid) in a molar ratio between 1.5:1 and 2:1 to the metal oxide and/or dissolved metal salt. A typical final compound is, for example, $Me[B_3O_4(OH)_3]$, in which Me=Fe, Co, Mo, or Ni, or $Me_2[B_3O_4(OH)_2]_3$, in which Me=Cr. It takes several hours to form the compounds, and this is seen as a significant increase in the rigidity of the ligand-type paste.

The invention is not limited to the above-presented examples but it can be modified within the scope of the claims.

The invention will be illustrated with the following examples.

EXAMPLE 1

At a site of remedying a contaminated soil area, a soil sample was taken at a point that, according to preliminary surveys, represented the most contaminated area. A trial batch was separated from the sample and precipitated according to stoichiometric calculations based on the total metal content of the sample in the preliminary survey. After the precipitation, the trial batch was dried and analyzed. The metals contained in the sample and their contents were measured by an accredited laboratory before and after the precipitation. It turned out that the known heavy metals and other metals had been precipitated, and no measurable contents of them could be found any more in a double shaking test. Furthermore, even to a surprise, it was found that some semi-metals, such as As and Sb, had also become insoluble. It was the same as with quicksilver which is normally considered problematic: it had also precipitated to an insoluble form. When these results were evaluated afterwards, it could be stated that in the end there was no surprise after all: the concentrate contained a total of 15 different metals, and in such a suitable composition that new precipitation nuclei were continuously available for the next metals in the process when it once had started. The significance of the correct use of the precipitation nuclei can be clearly seen in this test. Even selenium that was present in the concentrate was precipitated to insoluble form, although it is normally classified as non-metallic. However, it is known that the so-called grey allotrope of selenium acts like metals (conducts electricity and heat), and by certain thermal methods the other allotropes of selenium can also be converted to the grey form.

EXAMPLE 2

Water rich in sulphates and containing several metals, including Mg, Ni, Al, Mn, and Fe as ions in solution form, pH 5.65, was first treated with a boron compound by adding boric acid. Due to the buffering capacity of water, the pH was changed only a little, to the value of 5.5.

Next, the pH was gradually increased with NaOH, wherein precipitation took place. A bright overflow whose pH was between 10.5 and 11, was separated from the water, while the precipitate remained in the underflow. From the overflow, the following contents were measured, among other things (concentration/reduction from the initial value):

$Mg^{2+}$: 119 mg/l/−48%; $Ni^{2+}$: 0.484 mg/l/−84%; $Al^{3+}$: 0.018 mg/l/−98%; $Ni^{2+}$: 0.13 mg/l/−99.9%; $Fe^{2+/3+}$: 0.065 mg/l/−94%

The invention claimed is:

1. A method for precipitating metal waste in form of metal borates, wherein the waste which contains dissolved metal salts, is mixed with a boron compound, and the pH is adjusted to a value at which hydroxide precipitates of a first metal are formed to act as precipitation nuclei for formation of the metal borates, and
   wherein the pH is further adjusted to increase gradually for precipitating a second or further metals contained in the waste in form of metal borates.

2. The method according to claim 1, wherein said precipitation nuclei are formed as a result of increasing the pH.

3. The method according to claim 1, wherein the waste and the boron compound are mixed with other material to form a mixture whose pH gradually increases by the effect of reactions taking place in the mixture.

4. The method according to claim 3, wherein the waste is in a form of metal hydroxides precipitated with alkali, and the precipitating alkali is obtained as a result of hardening reaction of hydraulic cement.

5. The method according to claim 4, wherein the hydraulic cement either releases lime or binds lime when hardened, or is alkali-activated cement.

6. The method of claim 5, wherein the alkali activated cement is slag cement.

7. The method according to claim 4, wherein the hydraulic cement is Portland cement, aluminate cement or pozzolan cement.

8. The method according to claim 4, wherein metal waste is blended in concrete together with a boron compound.

9. The method of claim 8, wherein the boron compound is borax and/or boric acid.

10. The method according to claim 1, wherein at least two different metals are used in such a way that the hydroxide precipitate of the first metal, formed at a lower pH, is used as precipitation nuclei for precipitating the second metal that forms a hydroxide precipitate at a higher pH as a borate.

11. The method according to claim 1, wherein the pH is increased or it increases up to the value of 11.5.

12. The method according to claim 11, wherein the pH is increased or increases from the value of 7.

13. The method according to claim 8, wherein the boron compound, is admixed to the waste in advance, before the adjustment of the pH or blending in the concrete.

14. The method according to claim 1, wherein the waste is in the form of a precipitate and/or dissolved salts contained in the precipitate.

15. The method of claim 14, wherein the waste is in the form of a pickling acid solution, in the form of a precipitate and/or dissolved salts contained in the precipitate, or in soil.

* * * * *